(12) United States Patent
Hama et al.

(10) Patent No.: US 6,357,134 B1
(45) Date of Patent: Mar. 19, 2002

(54) HEIGHT GAUGE

(75) Inventors: Nobuyuki Hama, Kure; Yoichi Toida; Yuwu Zhang, both of Kawasaki, all of (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/484,224

(22) Filed: Jan. 18, 2000

(30) Foreign Application Priority Data

Jan. 20, 1999 (JP) .......................................... 11-011940

(51) Int. Cl.⁷ .............................. G01B 3/22; G01B 5/00
(52) U.S. Cl. ........................ 33/832; 33/703; 33/DIG. 2
(58) Field of Search .......................... 33/832, 833, 703, 33/DIG. 2

(56) References Cited

U.S. PATENT DOCUMENTS 3,895,356 A * 7/1975 Kraus ........................... 33/832
4,129,949 A * 12/1978 Callaghan, Jr. .............. 33/833
4,399,617 A    8/1983 Yoshioka
4,498,241 A * 2/1985 Nakaoki ....................... 33/703
4,679,326 A * 7/1987 Takizawa et al. ............. 33/832

FOREIGN PATENT DOCUMENTS

GB    2 042 732 A    9/1980

* cited by examiner

*Primary Examiner*—Diego Gutierrez
*Assistant Examiner*—Jason Gilchrist
(74) *Attorney, Agent, or Firm*—Oliff & Berridge PLC.

(57) ABSTRACT

A height gauge capable of being moved while confining a positional relationship between a probe and a workpiece with an easy posture is provided. A handle (21) is provided on a side of a column (12) having a probe (13) adjacent to a base (11). An air-floatation control switch (31) for controlling supply and cut-off of air to an air-floatation mechanism (19), a repeat switch (32), a cancel switch (33) are provided to the handle (21).

6 Claims, 10 Drawing Sheets

(BEEP SOUND1 ON COMPLETING CONTACT)

FIG. 7

(BEEP SOUND1 ON COMPLETING PROFILING MEASUREMENT)

FIG.8

(BEEP SOUND1 ON COMPLETING CONTACT)

FIG.9

(BEEP SOUND1 ON COMPLETING PROFILING MEASUREMENT)

HEIGHT GAUGE

BACKGROUND OF THE INVENTION

1. Field of the Invention

The present invention relates to a height gauge for measuring a dimension of a workpiece from a height position of a probe elevatable in up and down direction. More specifically, it relates to a height gauge capable of moving on a platen with an easy operation.

2. Description of Related Art

A large height gauge is used for measuring a dimension of a relatively large workpiece, i.e., dimension such as height, level difference, hole and axis.

Generally, a height gauge has a base movably disposed on a platen, a column provided to the base, a slider elevatable along the column and having a probe, and a displacement sensor for detecting a displacement amount in a height direction of the slider.

Since a large height gauge is heavy, an air-floatation mechanism in which base blows air onto the platen for floating the base relative to the platen is sometimes provided for facilitating movement thereof.

Figure 12:
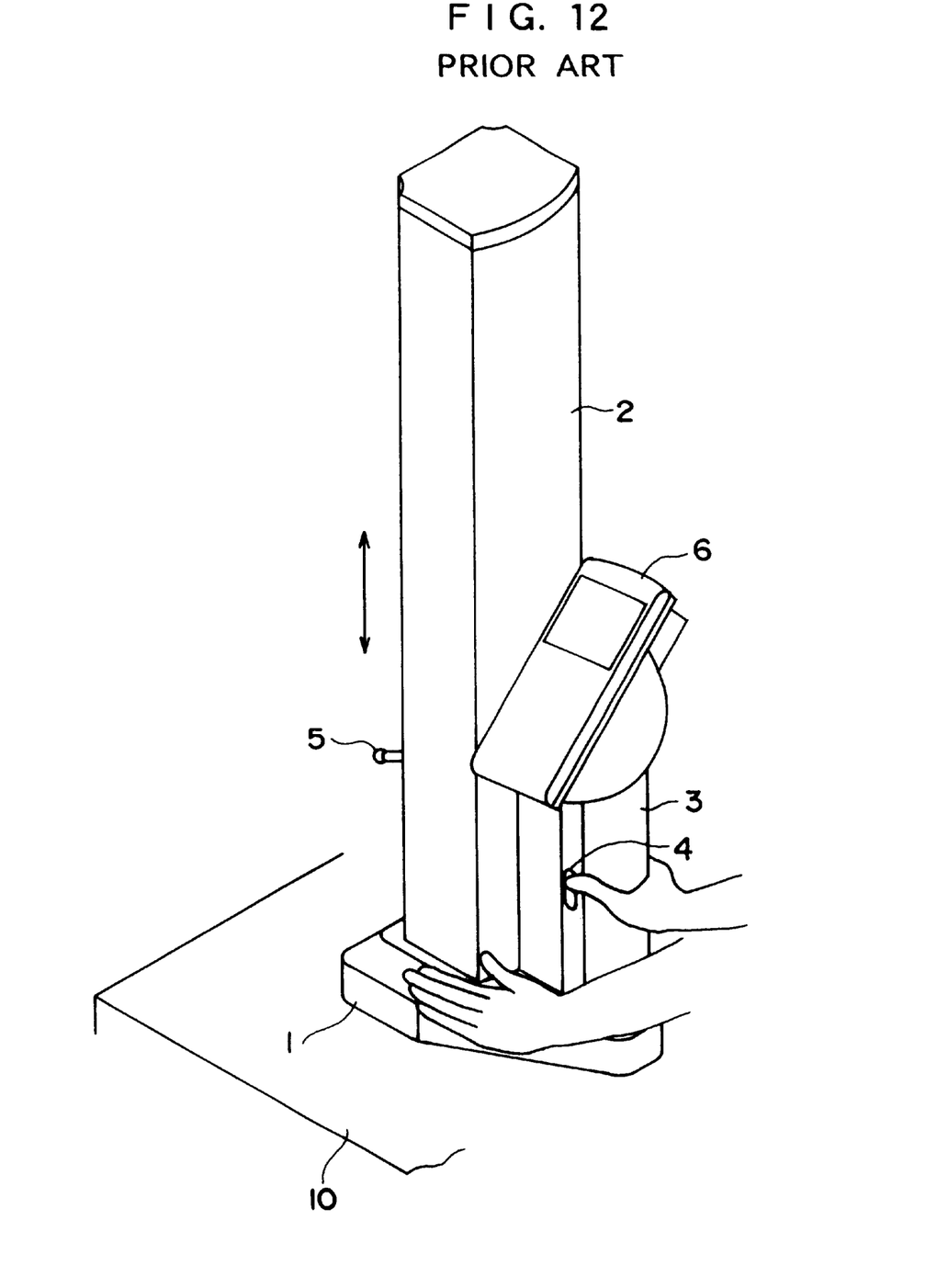
FIG. 12 is a perspective view showing measurement work of a conventional height gauge.

Conventionally, such large height gauge having the air-floatation mechanism has a grip 3 provided on a position easy for a floatation switch 4 to be pressed at a backside of the column 2 as shown in FIG. 12.

In operation, the grip 3 is grasped by one hand and the floatation switch 4 is pressed. Then, air is blown out from the base 1 to a platen 10 to float the base 1 relative to the platen 10. In this state, the base 1 is moved while being guided by the other hand. When the probe 5 is located adjacent to a target portion of the workpiece, the floatation switch 4 is released. Then, the air from the base 1 to the platen 10 is shut down so that the base 1 touches the platen 10, and the measurement process is conducted in this state.

In the conventional measurement work, since the worker has to move the base 1 while grasping tie grip 3 opposite to the probe 5 with the column 2 therebetween, it was difficult for the worker to check whether the probe 5 has reached to a position around the target portion of the workpiece, which can result in collision of the probe 5 against the workpiece.

On the other hand, when the worker stands on the probe 5 side for moving the base 1 while checking the status of the probe 5, the worker has to hold the grip 3 by extending the arm to a backside of the column 2, in other words, has to operate in an unnatural posture, and the floatation switch 4 is difficult to be operated. Especially, above work is extremely difficult in a so-called profiling measurement where the height gauge is moved while s touching the probe 5 to the workpiece.

SUMMARY OF THE INVENTION

An object of the present invention is to solve the above conventional problem and to provide a height gauge capable of being moved with an easy posture while checking positional relation between the probe and the workpiece and capable of facilitating a switch operation thereof.

The present invention is a height gauge having: a base movable on a platen; a column vertically provided on the base; a slider elevatable along the column and having a probe thereto a displacement sensor for detecting a displacement amount of the slider in a height direction; an air-floatation mechanism for floating the base against the platen by blowing out air from the base to the platen, which is characterized in having a handle on a side of the column adjacent to a probe side thereof around the base or on a base around the side of the column adjacent to the probe side, the handle having an air-floatation control switch for controlling supply and cut-off of air to the air-floatation mechanism.

According to the present invention, since the handle is provided on a side of the column adjacent to a probe side thereof around the base or on a base around the side of the column adjacent to the probe side, the base can be moved from the side adjacent to the probe side by grasping the handle. Accordingly, the handle can be grasped with an easy posture and the movement is possible while confirming whether the probe has reached around a target portion of the workpiece, thereby improving operability.

Especially, since the handle is provided to the column, a height from the platen to the handle can be established at any desired height without requiring special member for securing the height. For example, when the handle is provided to the base, thickness of the base has to be increased or a member for securing the height is required on the base for insuring the height from the platen to the handle. However, since the handle is provided to the column, no special member is required and any desired height can be established from the platen to the handle.

Further, since the air-floatation control switch for controlling supply and cut-off of the air to the air-floatation mechanism is provided to the handle, the air-floatation control switch can be operated while grasping the handle. Accordingly, the base can be moved and stopped on the platen with a single-hand operation.

In the present invention, the handle may preferably have a repeat switch for repeatingly commanding measurement steps of a previous measurement item.

According to the above arrangement, when a plurality of workpiece of the same sort is consecutively measured, the workpiece can be measured while grasping the handle with one hand and exchanging the workpiece with the other hand, thus improving measurement efficiency.

In the present invention, the handle may preferably have a cancel switch for commanding cancellation of the measurement step currently in process.

Accordingly, the measurement step currently in process can be cancelled while grasping the handle with one hand, thus improving measurement efficiency.

In the present invention, the handle may preferably be rotatable around an axis parallel to the column and fixable at any desired rotary angle position.

Accordingly, since the handle can be rotated around an axis parallel to the column, the handle can be turned to an angle easy for operation in accordance with a posture of the workpiece and the worker.

In the present invention, it is preferable that at least an end portion of the handle is inclinable in up and down direction and fixable at any desired inclination angle position.

Accordingly, since at least an end portion of the handle can be inclined in up and down direction, the handle can be operated at a status inclined at any inclined angle position. Further, when the end portion is inclined in up and down direction, the handle does not project in a horizontal direction, thus not impairing accommodatability and portability.

In the present invention, the air-floatation mechanism may preferably be capable of switching status thereof between a status in which the base is completely floated against the platen with a predetermined gap therebetween by blowing air from the base to the platen and a semi-floating status in which the base touches the platen with a weight of the base and a weight applied to the base being reduced by blowing air from the base to the platen.

According to the above arrangement, since the air-floatation mechanism is capable of switching the status thereof between a status in which the base is completely floated against the platen with a predetermined gap therebetween by blowing air from the base to the platen and a semi-floating status in which the base touches the platen with a weight of the base and a weight applied to the base being reduced by blowing air from the base to the platen, the movement can be facilitated while maintaining highly accurate measurement by conducting measurement under the semi-floating status in, for instance, profiling measurement.

DETAILED DESCRIPTION OF PREFERRED EMBODIMENT(S)

An embodiment of the present invention will be described below with reference to attached drawings.

Figure 1:
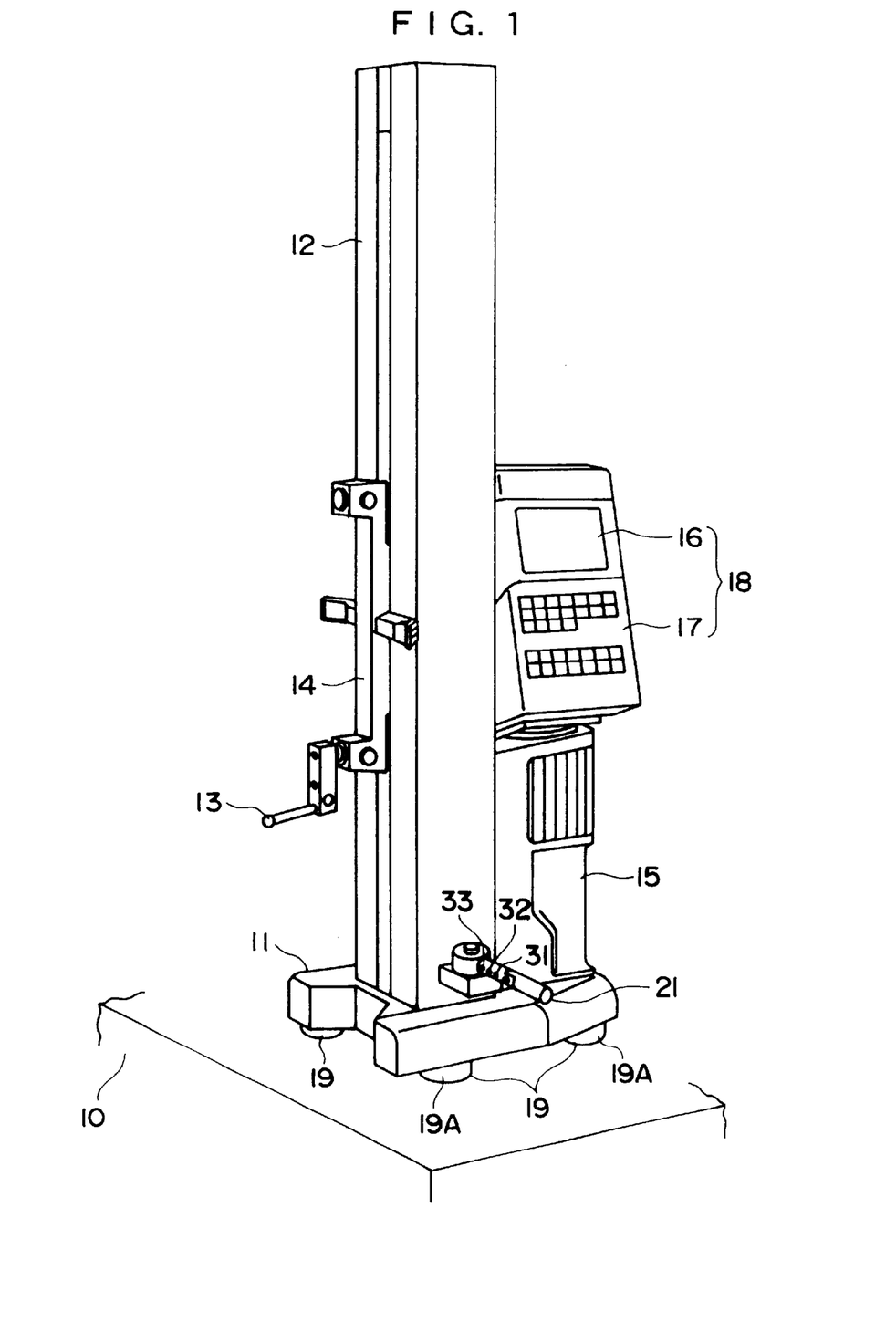
FIG. 1 is a perspective view showing an embodiment of a height gauge according to the present invention.

FIG. 1 is a perspective view of a height gauge (measuring equipment) of the present embodiment. As shown in the figure, the height gauge according to the present embodiment includes a base 11 movably disposed on a platen 10, a column 12 vertically disposed on tile base 11, a slider 14 elevatable in up and down direction along the column 12 and having a probe 13, a grip portion 15 provided to the base 11 opposite to the column 12, a display console 18 provided to an upside of the grip portion 15 and having a display 16 such as LCD and a key input portion 17 on a surface thereof, and an air-floatation mechanism 19 for blowing out air from the base 11 to the platen 10 to float the base 11 relative to the plain 10.

The air-floatation mechanism 19 includes a plurality of air pad 19A provided to a lower side of the base 11 and having a number of air blowout hole, and a compressor for feeding air to the air pad 19A (though not shown, provided to a lower part of the grip portion 15).

The air-floatation mechanism 19 can change rotational frequency of a motor for driving the compressor, thus being capable of switching status thereof between a status where the base 11 is completely floated with a predetermined gap against the platen 10 by blowing out the air from the base 11 to the platen 10, and a semi-floating status where the base 11 touches the platen 10 with a weight of the base 11 and a weight applied to the base 11 being reduced by blowing out an air from the base 11 to the platen 10.

A handle 21 projects from a right side of the column 12 (i.e. a side adjacent to a side having the probe 13) adjacent to the base 11 (i.e. lower position) orthogonally with the column 12.

Figure 2:
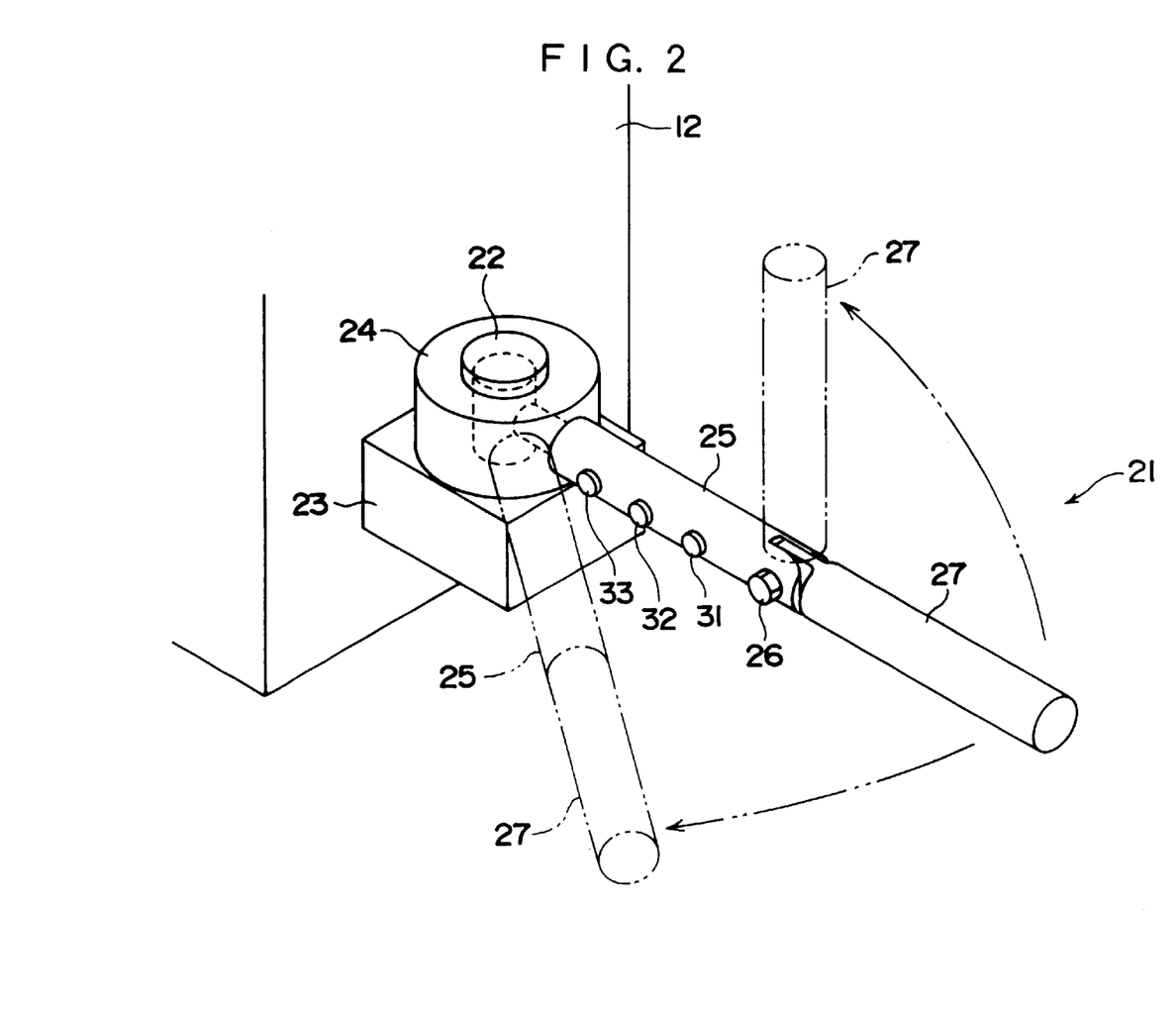
FIG. 2 is an enlarged perspective view showing handle portion of the aforesaid embodiment.
Figure 3:
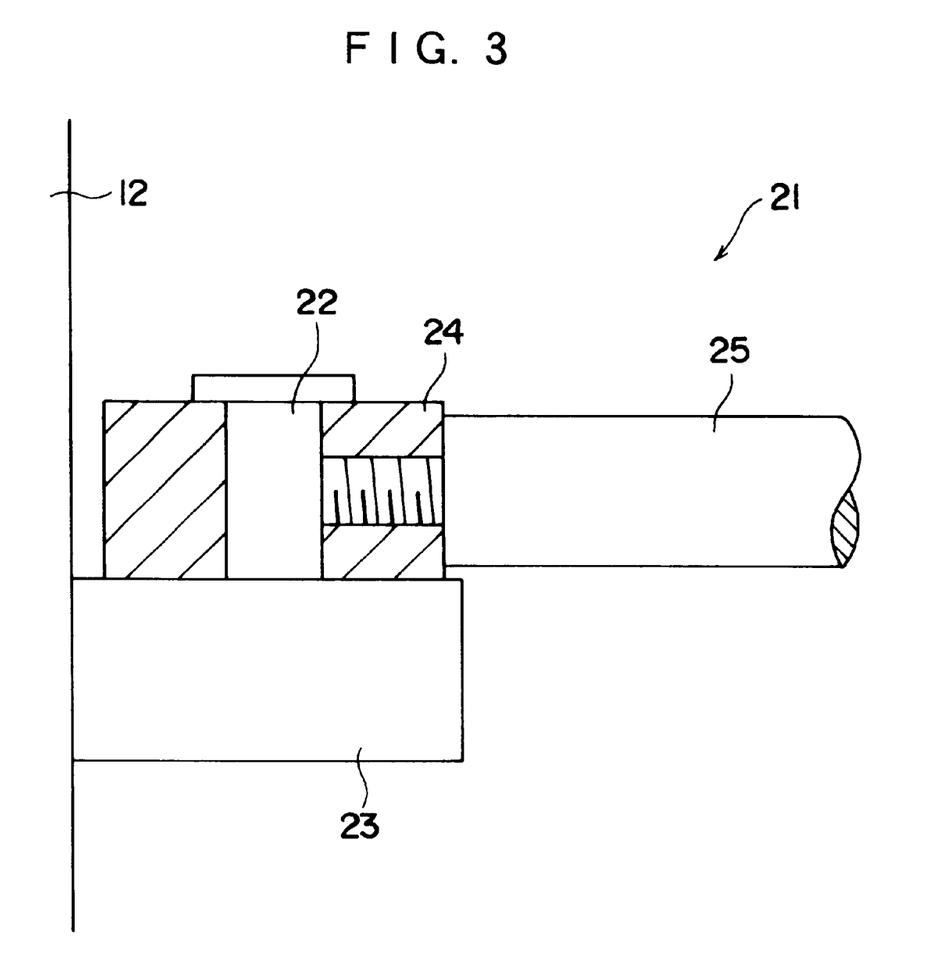
FIG. 3 is a cross section of the handle portion of FIG. 2.

As shown in FIG. 2 and FIG. 3, the handle 21 is composed of a stationary member 23 fixed to a lower part of the right side of the column 12 and having a pivot axis 22 on an upper side thereof, a rotary ring 24 rotatable around the pivot axis 22, a rotary shaft 25 screwed to an outer circumference of the rotary ring 24 with an end being capable of abutting and separating relative to the pivot axis 22, and an inclining shaft 27 provided to an end of tile rotary shaft 25 capable of being inclined in up and down direction through a bolt/nut 26. Accordingly, the handle 21 can rotate around the pivot axis 22 parallel to the column 12 and being fixed at any rotary angle position, and at least the inclining shaft 27 at an end is capable of being inclined in tip and down direction and capable of being fixed at any inclination angle position.

An air-floatation switch 31, a repeat switch 32 and a cancel switch 33 are provided to the rotary shaft 25 sequentially from the inclination shaft 27 side to a base thereof.

The air-floatation switch 31 controls supply and cut-off of the air toward the air-floatation mechanism 19. The repeat switch 32 repeatingly commands a measurement process in a previous measurement item. The cancel switch 33 commands cancellation of the measurement process now in progress.

Figure 4:
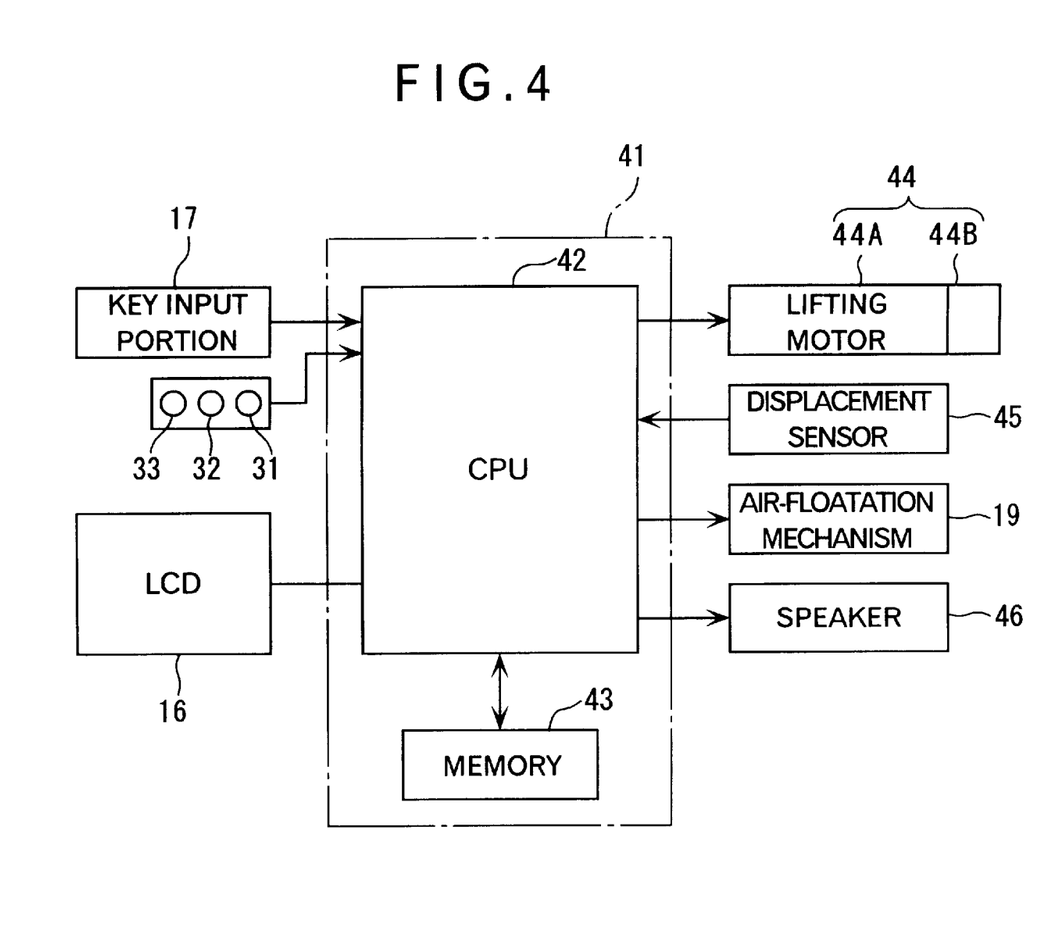
FIG. 4 is a block diagram of the aforesaid embodiment.

FIG. 4 is a block diagram of a height gauge of the present invention. In the figure, a controller 41 has a CPU 42 and a memory 43.

An elevation driving means 44 for elevating the slider 14 in up and down direction, a displacement sensor 45 for detecting a height displacement of the slider 14 elevated by the elevation driving means 44 and a speaker 46 are connected to the CPU 42 as well as the key input portion 17, three switches 31, 32 and 33 provided to the handle 21, the display 16 and the air-floatation mechanism 19.

The elevation driving means 44 includes a lifting motor 44A and a constant pressure mechanism 44B provided to an output shaft of the lifting motor 44A. The constant pressure mechanism 44B transmits the rotation of the lifting motor 44A to the slider 14 through a transmission of belt etc. to elevate the slider 14 and includes a mechanism for idly running when a load exceeding a predetermined value is applied to the slider 14.

The displacement sensor 45 includes a scale having an optical grid provided along the column 12 and a sensor disposed on the slider 14 opposite to the scale, both the scale and the sensor cooperating to detect the height displacement amount of the slider 14 on the column 12 as an electric signal.

Measurement process program for various measurement item is stored in the memory 43, and symbol and character data representing content of the measurement item, symbol and character data representing respective steps, operation guidance information and voice information indicating completion of respective steps are stored in accordance with the respective steps of the respective measurement process program. Further, measurement data and calculation result data obtained by operating the measurement data are stored in the memory 43.

Next, a function of the present embodiment will be described below.

In initiating measurement, the handle 21 is. grasped with one hand and the air-floatation control switch 31 is pressed by a thumb of the hand. Then, the base 11 floats relative to the platen 10 by the air-floatation mechanism 19 so that the base 11 is moved with the handle 21 being grasped to locate the probe 13 adjacent to a target portion of the workpiece while being floated, and the hand is released from the air-floatation control switch 31. Accordingly, since the air is cut off, the base 11 rests while touching the platen 10.

Measurement of an inner dimension of a hole of a workpiece will be described below as an example.

Figure 5:
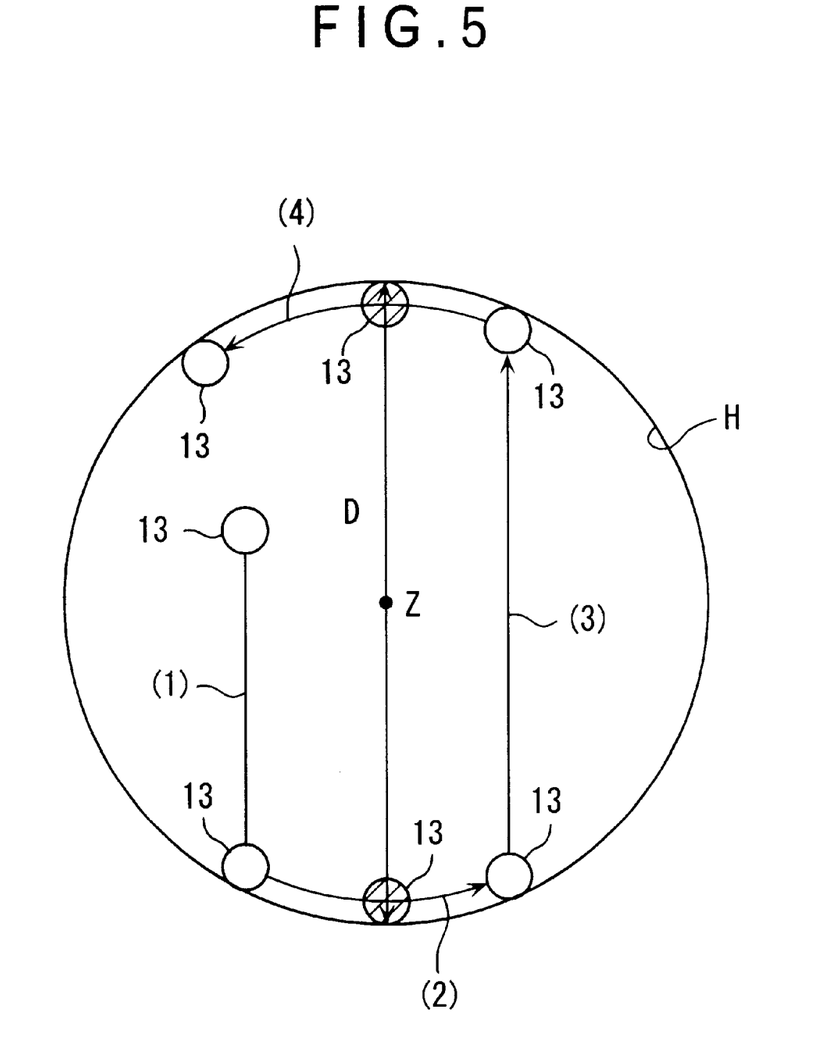
FIG. 5 is an illustration of a process for measuring inner diameter of a hole in the aforesaid embodiment.

In measuring the inner dimension of a hole, the probe 13 is inserted into the hole and measurement initiation is commanded from the key input portion 17. The CPU 42 drives the elevation driving means 44 to lower the slider 14. Then, the probe 13 descends as shown in (1) of FIG. 5. Incidentally, H in FIG. 5 represents the hole of the workpiece.

Figure 6:
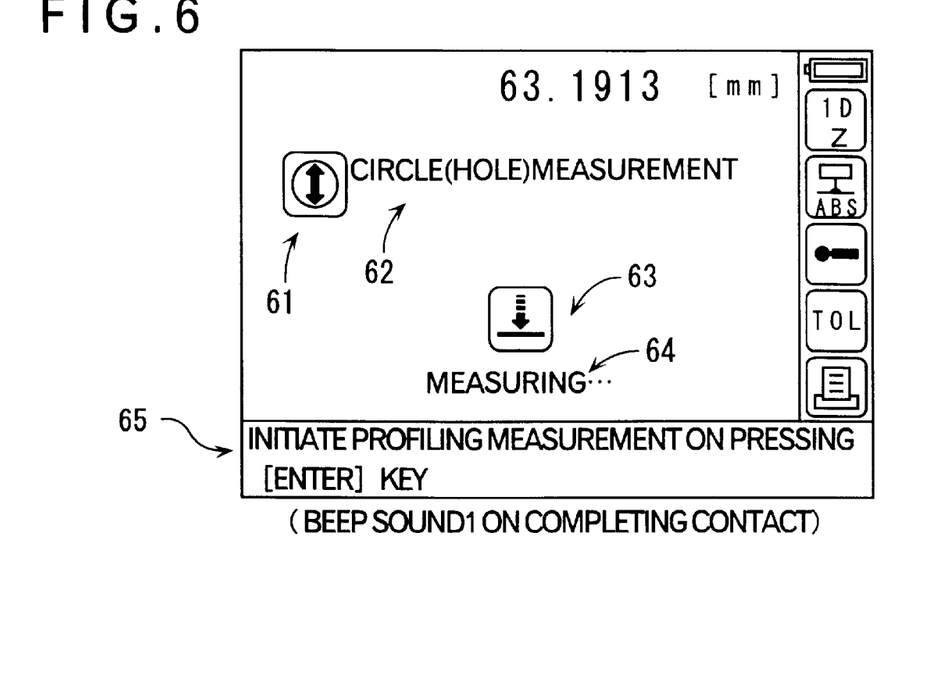
FIG. 6 is an illustration showing a probe lowering step screen in measuring inner diameter of a hole.

At this time, a screen shown in FIG. 6 is displayed on the display 16. Specifically, circle (hole) measurement item is indicated by a symbol 61 and character data 62, probe lowering step is indicated by a symbol 63 and character data 64 and operation guidance information 65 (information that profiling measurement can be started by pressing [ENTER] key) is displayed on a lower column.

Subsequently, when the probe 13 detects contact with a lower wall of the hole H (see (1) of FIG. 5), a contact completion sound is outputted, thus finishing the probe lowering step.

Figure 7:
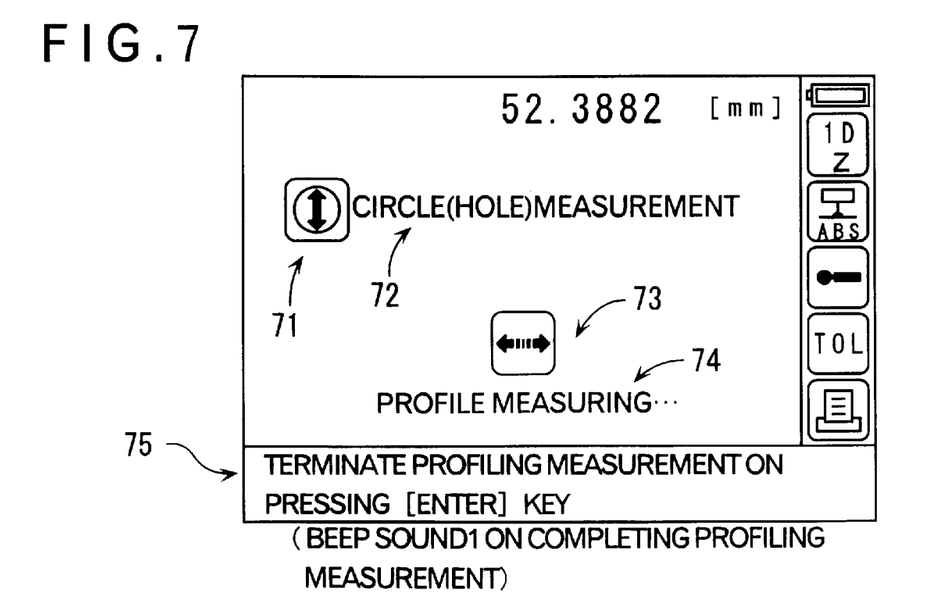
FIG. 7 is an illustration showing a profiling measurement step screen in measuring inner diameter of a hole.

Next, after terminating the probe lowering step, the screen of FIG. 7 is displayed on the display 16. Specifically, circle (hole) measurement item is indicated by a symbol 71 and character data 72, profiling measurement step is indicated by a symbol 73 and character data 74 and operation guidance information 75 (information that profiling measurement can be terminated by pressing [ENTER] key) is displayed on a lower column.

The worker conducts the profiling measurement in view of the indication. More specifically, the worker moves the base 11 of the height gauge to move the probe 13 in a diameter direction of the hole H of the workpiece. Specifically, the probe 13 is moved as shown in (2) of FIG. 5. Then, a Z coordinate value when the probe 13 is located to a lowermost point of the hole H is fetched and a profiling completion sound is outputted after movement of a predetermined distance from the position to finish the profiling measurement step. Incidentally, since the air-floatation mechanism 19 has been switched into a semi-floating status, movement thereof is easy without deteriorating measurement accuracy.

Subsequently, when the profiling measurement step is finished, the CPU42 drives the elevation driving means 44 to raise the slider 14. Then, the probe 13 is raised as shown in (3) of FIG. 5.

Figure 8:
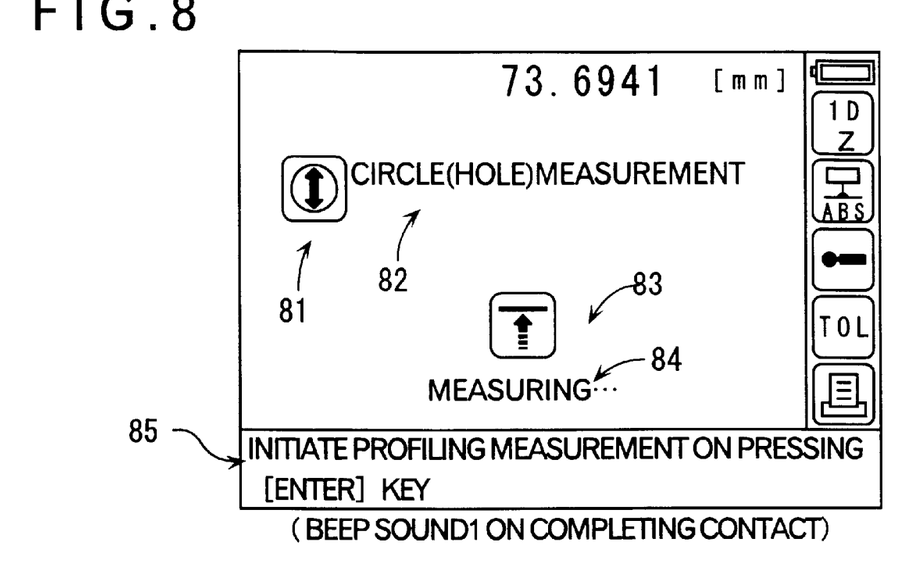
FIG. 8 is an illustration showing a probe raising step screen in measuring inner diameter of a hole.

During the step, the display 16 shows a screen shown in FIG. 8. Specifically, circle (hole) measurement item is indicated by a symbol 81 and character data 82, probe raising step is indicated by a symbol 83 and character data 84 and operation guidance information 85 (information that profiling measurement can be initiated by pressing [ENTER] key) is displayed on a lower column.

Subsequently, when tile probe 13 detects contact with an upper wall of the hole H (see (3) of FIG. 5), a contact completion sound is outputted, thus finishing the probe raising step.

Figure 9:
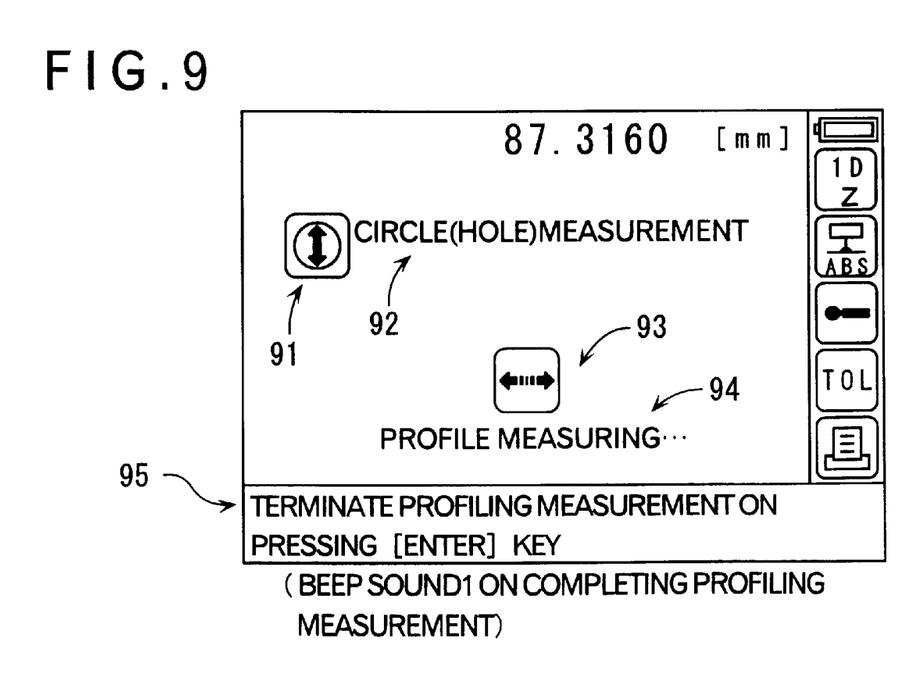
FIG. 9 is an illustration showing a profiling measurement step screen in measuring inner diameter of a hole.

Next, when the probe raising step is terminated, the display 16 shows a screen shown in FIG. 9. Specifically, circle (hole) measurement item is indicated by a symbol 91 and character data 92, profiling measurement step is indicated by a symbol 93 and character data 94 and operation guidance information 95 (information that profiling measurement can be initiated by pressing [ENTER] key) is displayed on a lower column.

The worker conducts the profiling measurement in view of the indication. More specifically, tile worker moves the base 11 of the height gauge to move the probe 13 in a diameter direction of the hole H of tile workpiece. Specifically, tile probe 13 is moved as shown in (4) of FIG. 5. Then, a Z coordinate value when the probe 13 is located to a lowermost point of tile hole H is fetched and a profiling completion sound is outputted after movement of a predetermined distance from the position to finish the profiling measurement step. Incidentally, since the air-floatation mechanism 19 has also been switched into a semi-floating status, movement thereof is easy without deteriorating measurement accuracy.

Figure 10:
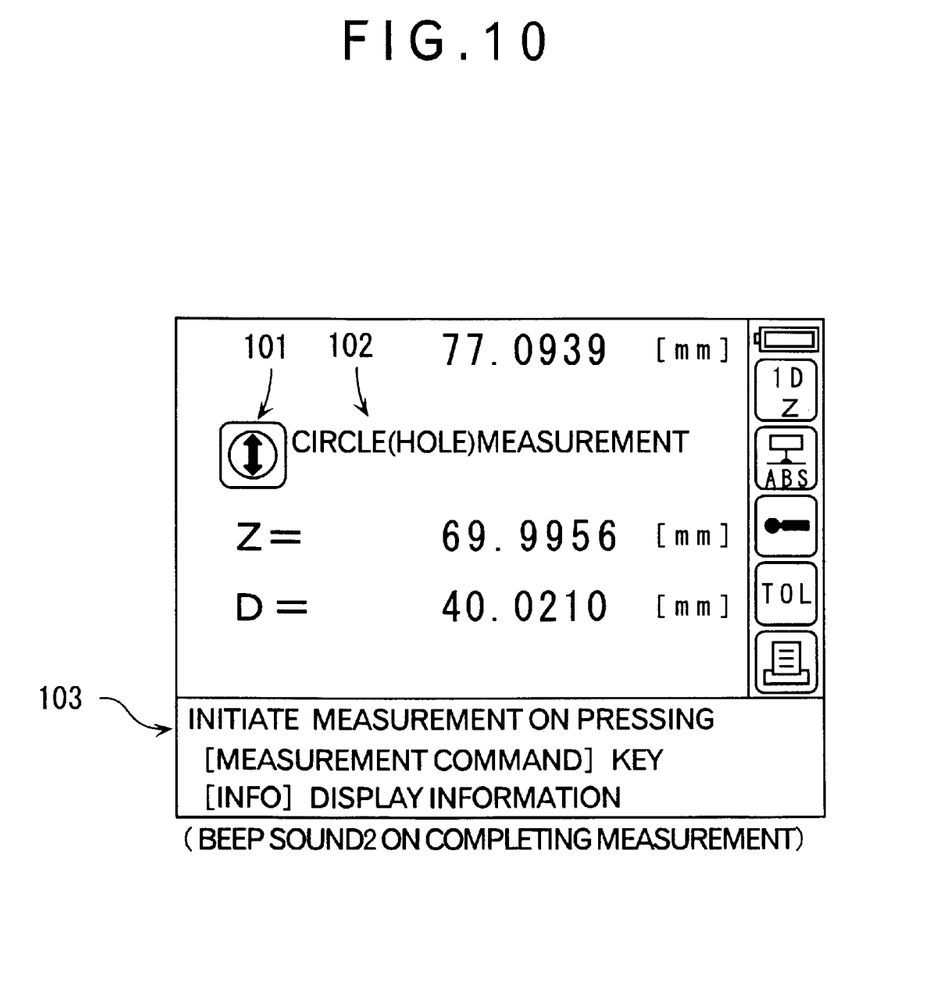
FIG. 10 is an illustration showing a measurement result screen in measuring inner diameter of a hole.

Next, when the profiling measurement step is terminated, the display 16 shows a screen shown in FIG. 10. Specifically, circle (hole) measurement item is indicated by a symbol 101 and character data 102, central coordinate value Z and diameter D of the hole obtained by the measurement item is indicated, and operation guidance information 105 (information that profiling measurement can be initiated by pressing [ENTER] key) is displayed on a lower column.

The inner diameter of tile hole H can be measured according to the above respective steps. However, as showing in FIG. 11, in order to consecutively measure two holes H1 and H2, height difference h between the two holes H1 and H2 may be registered in advance, and a "wait indication may be displayed oil the display 16 when the measurement of the hole H1 is terminated and a message to the effect that the probe 13 is pulled out from the hole H1 of the workpiece may be displayed, thus instructing the next work to the worker.

Figure 11:
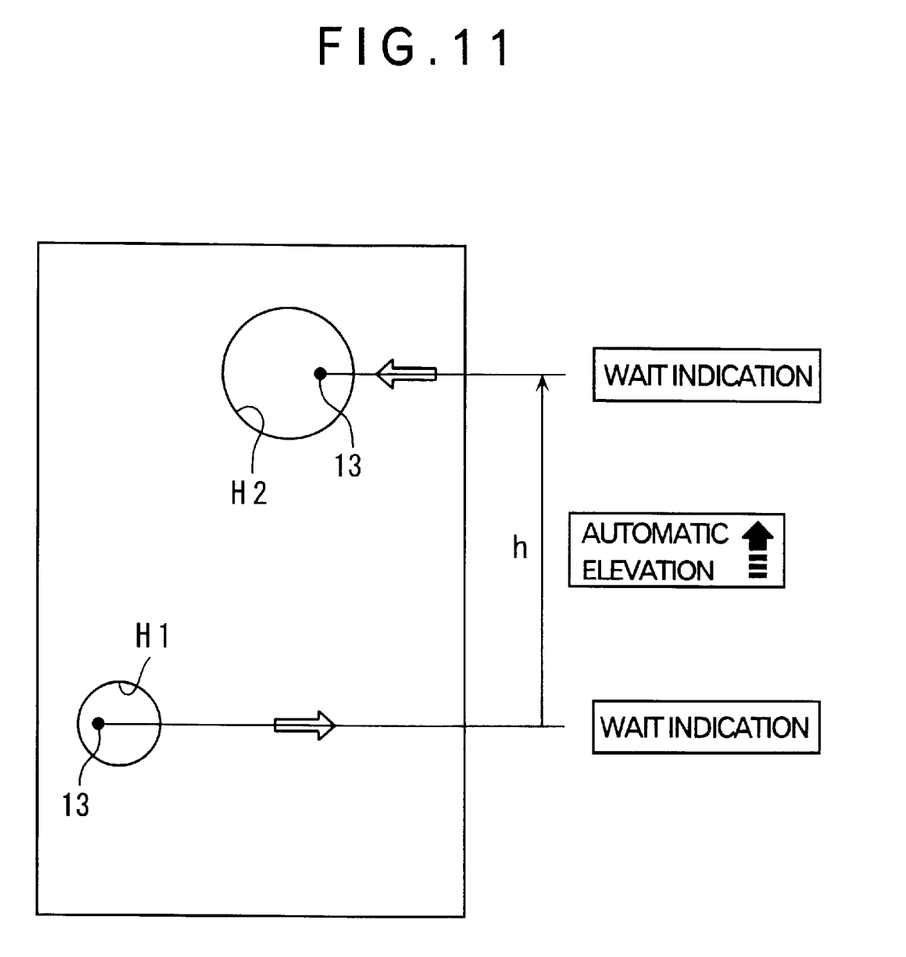
FIG. 11 is an illustration showing consecutive measurement step of an inner diameter of a plurality of hole.

Subsequently, after automatically raising the probe 13 by the previously registered difference h after a predetermined time period, the "wait indication" may be displayed on the display 16 and a message to the effect that the probe 13 is inserted to the hole H2 of the workpiece may be displayed, thereby instructing the next work to the worker.

Accordingly, consecutive measurement of the plurality of holes H1 and H2 can be conducted while giving instructions to the worker.

According to the present embodiment, since the handle 21 is provided to the lower side position of the column 12, the handle 21 can be grasped with an easy posture while checking whether the probe 13 has reached adjacent to the target portion of the workpiece, thus improving operability thereof during movement.

Since the handle 21 is provided to the column 12, any special member for securing a height from the platen 10 to the handle 21 is necessary for establishing desired height. For instance, when the handle 21 is provided to the base 11, thickness of the base 11 has to be increased or an additional member on the base 11 for securing height is necessary. However, since the handle 21 is provided to the column 12, any special member is necessary and desired height from the platen 10 to the handle 21 can be established.

Since the handle 21 is provided with the air-floatation control switch 31 for controlling supply and cut-off of the air to the air-floatation mechanism 19, the repeat switch 32 for repeatingly commanding the measurement process and the cancel switch 33 sequentially aligned from a grip side, the switches 31, 32 and 33 can be manipulated while grasping the handle 21. Accordingly, the base 11 can be moved and stopped, and consecutive measurement and cancel operation are possible with a single-hand operation, thereby improving measurement efficiency.

Since the handle 21 includes the rotary shaft 25 rotatable around the pivot axis 22 parallel to the column 12 and fixable at a desired rotary angle position, and the inclining shaft 27 provided at an end of the rotary shaft 25 inclinable in up and down direction, the rotary shaft 25 can be rotated around the pivot axis 22 to change an angle of the handle 21 for improving operability and the inclining shaft 27 can be inclined in up and down direction to prevent from being projected to a horizontal direction, thus not being an obstacle for accommodation and portability.

Further, since the status of the air-floatation mechanism 19 can be switched between a status where the base 11 is completely floated against the platen 10 with a predetermined gap therebetween by blowing air from the base 11 to the platen 10 and the semi-floating status where the base 11 touches the platen 10 while reducing the weight of the base 11 and the weight applied to the base 11 by blowing air from the base 11 to the platen 10, the movement can be facilitated during, for instance, profiling measurement by measuring under the semi-floating status with high-accuracy being maintained.

Further, since the handle 21 is provided for the movement, the movement is possible with the handle 21 being grasped at an easy posture while confirming that the probe 13 touches the target portion of the workpiece, though heavy as compared to completely floated status. In other words, operability during the profiling measurement can be improved.

Incidentally, though the handle 21 is projected at the lower right side of the column 12 in the aforesaid embodiment, the handle 21 may be provided to a lower left side, or selectively to either one of the right and left sides. Further, the handle 21 may be projected to both sides of the column 21 in advance.

The member to which the handle 21 is attached is not limited to the column 12 but may be provided on the base 11 around a side adjacent to the probe 13 side of the column 12. However, when the handle 21 is provided to the column 12, no special member for securing the height from the platen 10 to the handle 21 is not required, so that desired height setting is possible.

Further, though the handle 21 in the aforesaid embodiment includes the rotary shaft 25 rotatable around the pivot axis 22 parallel to the column 12 and fixable at a desired rotary angle position, and the inclining shaft 27 provided at an end of the rotary shaft 25 inclinable in up and down direction, other arrangement is possible.

For instance, the handle 21 may be rotatable in front, back, up and down direction and fixable at any desired angle position with a ball joint etc. or, alternatively, the handle 21 may be constructed of a shaft member and a plurality of shaft member separably connected in an axial direction for adjusting length thereof.

What is claimed is:

1. A height gauge comprising:
   a base movable on a platen;
   a column having a first side and a second side vertically provided on the base, wherein the second side abuts the first side;
   a slider elevatable along the column on the first side and having a probe attached to a first surface of the slider;
   a displacement sensor for detecting a displacement amount of the slider in a height direction;
   an air-flotation mechanism for floating the base against the platen by blowing out air from the base to the platen; and
   a handle, operable with a user's single hand, attached on the second side of the column near the base or attached on the base by the second side of the column, the handle having a first side that faces a same direction as the first surface and a second side that faces a direction opposite the first surface, the handle having an air-flotation control switch for controlling supply and cut-off air to the air-flotation mechanism.

2. The height gauge according to claim 1, the handle further comprising a repeat switch for repeatedly commanding measurement steps of a previous measurement item.

3. The height gauge according to claim 1, the handle further comprising a cancel switch for commanding cancellation of the measurement step currently in process.

4. The height gauge according to claim 1, wherein the handle is rotatable around an axis parallel to the column and fixable on the base or column at any desired rotary angle position.

5. The height gauge according to claim 4, wherein at least an end portion of the handle is inclinable in tip and down direction and fixable at any desired inclination angle position.

6. The height gauge according to claim 1, wherein the air-flotation mechanism is capable of switching status thereof between a status in which the base is completely floated against the platen with a predetermined gap therebetween by blowing air from the base to the platen and a semi-floating status in which the base touches the platen with a weight of the base and a weight applied to the base being reduced by blowing air from the base to the platen.

* * * * *